(12) United States Patent
Hirose et al.

(10) Patent No.: US 7,832,531 B2
(45) Date of Patent: Nov. 16, 2010

(54) BICYCLE COMPONENT FIXING BAND

(75) Inventors: Kazuyuki Hirose, Osaka (JP); Osamu Kariyama, Osaka (JP)

(73) Assignee: Shimano Inc., Osaka (JP)

( * ) Notice: Subject to any disclaimer, the term of this patent is extended or adjusted under 35 U.S.C. 154(b) by 111 days.

(21) Appl. No.: 12/399,307

(22) Filed: Mar. 6, 2009

(65) Prior Publication Data

US 2010/0224740 A1    Sep. 9, 2010

(51) Int. Cl.
    *B62L 3/06* (2006.01)
(52) U.S. Cl. .................... 188/344; 188/24.22
(58) Field of Classification Search ............. 188/24.14, 188/24.22, 26, 344; 60/562, 588
    See application file for complete search history.

(56) References Cited

U.S. PATENT DOCUMENTS

| 5,082,093 | A  | * | 1/1992  | Sule ................ 188/24.22 |
| 7,757,821 | B2 | * | 7/2010  | Tetsuka et al. .......... 188/26 |
| 2006/0185360 | A1 | | 8/2006 | Takizawa et al. |
| 2006/0185941 | A1 | | 8/2006 | Matsushita |
| 2006/0278031 | A1 | | 12/2006 | Takizawa et al. |
| 2007/0051575 | A1 | * | 3/2007 | Lumpkin .............. 188/344 |
| 2007/0209360 | A1 | | 9/2007 | Takizawa et al. |
| 2008/0060885 | A1 | | 3/2008 | Ruckh et al. |
| 2008/0251334 | A1 | * | 10/2008 | Takizawa et al. ....... 188/344 |

* cited by examiner

*Primary Examiner*—Christopher P Schwartz
(74) *Attorney, Agent, or Firm*—Global IP Counselors, LLP

(57) ABSTRACT

A bicycle component fixing band is provided with a first base part, a second base part, a hinge structure, a releasable connecting structure and a lock pin. The base parts are pivotally connected together at their pivot ends by the hinge structure. The releasable connecting structure releasably couples fastening ends of the base parts together. The lock pin is movable between a locking position and an unlocking position. The lock pin is engaged with both of the pivot ends of the base parts when the lock pin is in the locking position to prevent relative movement of the base parts. The lock pin is disengaged from one of the pivot ends of the base parts when the lock pin is in the unlocking position to permit relative movement of the base parts.

11 Claims, 12 Drawing Sheets

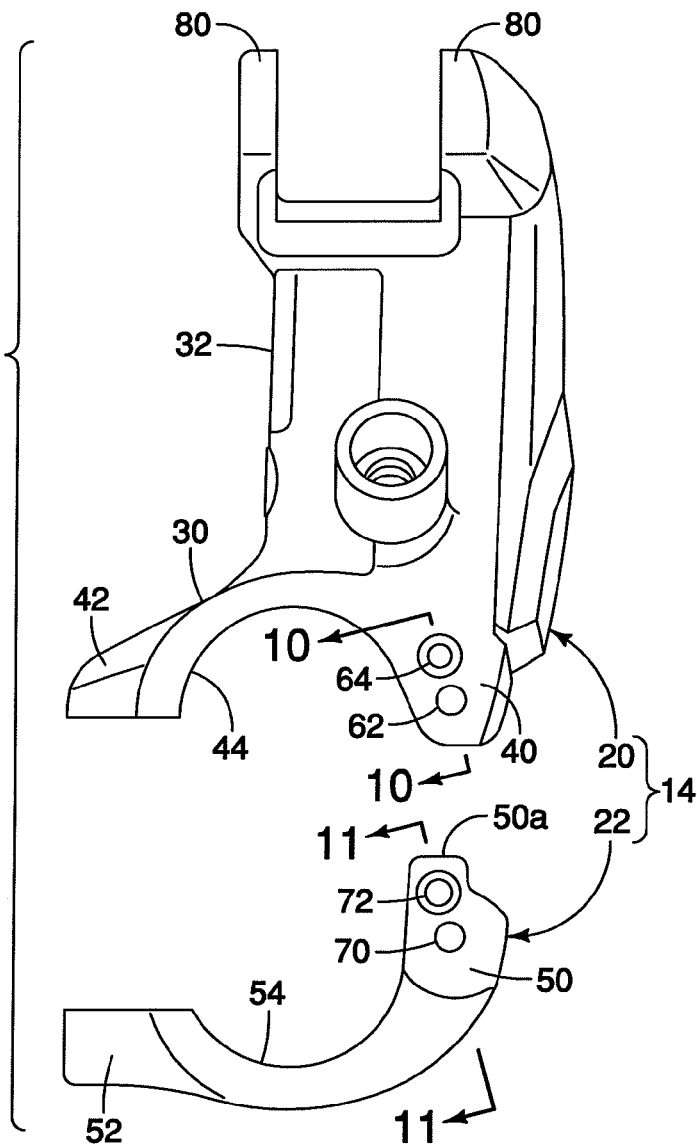
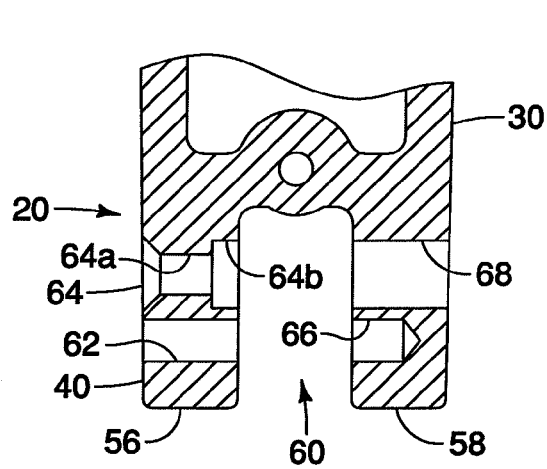
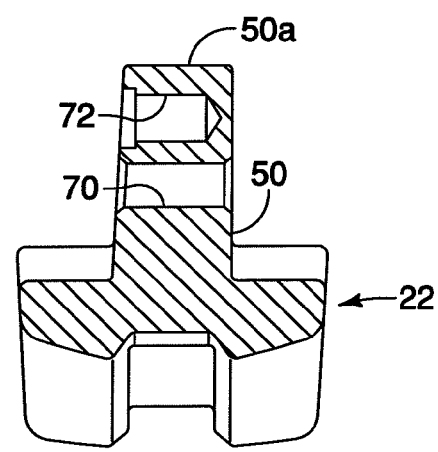
FIG. 9
FIG. 10
FIG. 11

US 7,832,531 B2

BICYCLE COMPONENT FIXING BAND

BACKGROUND OF THE INVENTION

1. Field of the Invention

This invention generally relates to a bicycle component fixing band for fixing a bicycle component to a part of a bicycle. More specifically, the present invention relates to an open type fixing band with drop-off prevent structure for fixing a bicycle brake operating device to a part of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, hydraulic brakes have become popular in the mountain bicycles. A typically bicycle hydraulic brake system includes a hydraulic brake actuation device, a rotor attached to one of the bicycle wheels and a caliper adjacent to the rotor with brake pads that selectively contact the rotor in response to changes in hydraulic pressure in the hydraulic brake actuation device. The hydraulic brake actuation device usually mounted to the bicycle handlebar by a conventional band clamp. The hydraulic brake actuation device typically includes a master piston in a master cylinder which is actuated by a brake lever. The master piston is movable within the master cylinder from a start position near a first end of the cylinder to a pressurized position near the second end of the cylinder. Between the first and second ends of the cylinder is a port in fluid communication between an inside of the cylinder and a hydraulic fluid reservoir. As the piston moves from the start position toward the timing port, hydraulic fluid flows from the timing port to the reservoir. The travel between the start position of the piston and the timing port is known as the dead-band. Once the seal associated with the piston moves between the port and the second end of the cylinder, fluid within the second end of the cylinder and hydraulic lines in fluid communication with the caliper become pressurized and the caliper is actuated. In other words, the changes in the hydraulic pressure cause movement of the slave piston such that the brake pads in the caliper grip the rotor. Typically, the brake pads are spaced apart from braking surfaces of the rotor until urged into braking contact with the rotor by movement of the slave piston.

SUMMARY OF THE INVENTION

One object of the present invention is to provide a bicycle component fixing band with drop-off prevention structure that retains a bicycle component on a part of a bicycle, after the fixing screw has been removed from the bicycle component fixing band.

According to one aspect, a bicycle component fixing band is provided that basically comprises a first base part, a second base part, a hinge structure, a releasable connecting structure and a lock pin. The first base part includes a bicycle component portion and a bicycle attachment portion having a first pivot end, a first fastening end and a first mounting surface disposed between the first pivot end and the first fastening end. The second base part has a second pivot end, a second fastening end and a second mounting surface disposed between the second pivot end and the second fastening end. The hinge structure pivotally coupling the first and second pivot ends of the first and second base parts together about a pivot axis. The releasable connecting structure releasably couples the first and second fastening ends of the first and second base parts together. The lock pin is movably disposed between the first and second base parts to move between a locking position and an unlocking position. The lock pin is engaged with both of the first and second pivot ends of the first and second base parts when the lock pin is in the locking position. The lock pin is disengaged from one of the first and second pivot ends of the first and second base parts when the lock pin is in the unlocking position.

According to another aspect, the bicycle component fixing band is provided as part of a hydraulic brake actuation device that is clamped to a part of a bicycle.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure:

FIG. 9 is an exploded side elevational view of the first and second base parts of the hydraulic disc brake assembly illustrated in FIGS. 1 to 8;

FIG. 10 is a cross sectional view of the second base part of the hydraulic disc brake assembly as seen along section line 10-10 in FIG. 9;

FIG. 11 is a cross sectional view of the first base part of the hydraulic disc brake assembly as seen along section line 11-11 in FIG. 9;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
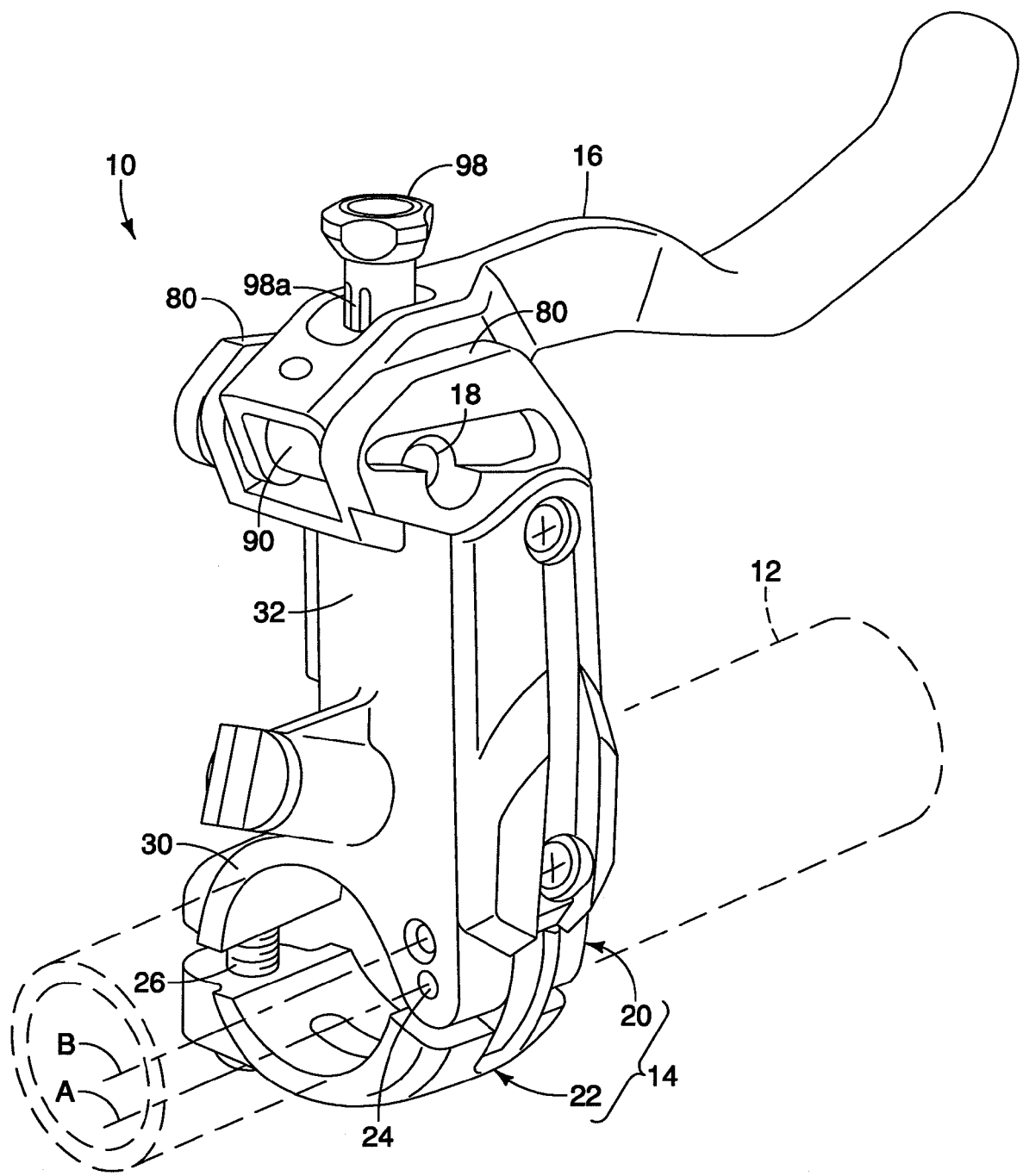
FIG. 1 is a perspective view of a hydraulic disc brake assembly with a bicycle component fixing band in accordance with one embodiment.

Referring initially to FIG. 1, a hydraulic brake actuation device 10 is illustrated in which the hydraulic brake actuation device 10 is attached to a bicycle handlebar 12 in accordance with one embodiment. The hydraulic brake actuation device 10 is preferably a hydraulic brake lever assembly that is part of a hydraulic disc brake system (not shown). Basically, the hydraulic brake actuation device 10 generally includes a base member 14 and a brake lever 16. The brake lever 16 is pivotally mounted to the base member 14 by a pivot pin 18 such that a braking operation is performed by pivotal movement of the brake lever 16 from a rest position to braking position. The base member 14 constitutes a bicycle component fixing band that is especially adapted for pivotally support the brake lever 16 to the bicycle handlebar 12.

The bicycle component fixing band or base member 14 basically includes a first base part 20 and a second base part 22 with the second base part 22 being pivotally connected to the first base part 20 by a pivot or hinge pin 24. The hinge pin 24 defines a pivot axis A in which the second base part 22 pivot relative to the first base part 20 between a closed position and an open position. In the closed position, the hydraulic brake actuation device 10 cannot be removed from the bicycle handlebar 12 by radial movement of the hydraulic brake actuation device 10 with respect to the center axis of the bicycle handlebar 12. In the open position, the hydraulic brake actuation device 10 can be removed from the bicycle handlebar 12 by radial movement of the hydraulic brake actuation device 10 with respect to the center axis of the bicycle handlebar 12. A clamping screw or bolt 26 is used to tighten or clamp the first and second base parts 20 and 22 together about the bicycle handlebar 12. Thus, the hinge pin 24 constitutes a hinge structure, while the fixing bolt 26 constitutes a releasable connecting structure.

The bicycle component fixing band or base member 14 is also provided with a locking pin 28 movably disposed between the first and second base parts 20 and 22 to move between a locking position and an unlocking position. The lock pin 28 is movably along an axis B that is offset from the pivot axis A. When the locking pin 28 is in the locking position, the fixing bolt 26 can be completely removed and the first and second base parts 20 and 22 will remain in a closed position around the bicycle handlebar 12 so that the hydraulic brake actuation device 10 will not fall off the bicycle handlebar 12. When the locking pin 28 is moved from the locking position to the unlocking position, the second base part 22 can now freely pivot relative to the first base part 20 about the hinge pin 24. The locking pin 28 is configured with respect to the first and second base parts 20 and 22 so that the a small amount of relative movement or play occurs between the first and second base parts 20 and 22 when the locking pin 28 is in the locking position. This small amount of relative movement or play allows the fixing bolt 26 to be tightened to securely fix the hydraulic brake actuation device 10 in a desired (fixed) orientation on the bicycle handlebar 12.

As seen in FIGS. 1 to 4, the first base part 20 includes a bicycle attachment portion 30 and a bicycle component portion 32. In the illustrated embodiment, the bicycle attachment portion 30 of the first base part 20 cooperates with the second base part 22, as discussed below, to clamp onto the bicycle handlebar 12. Also in the illustrated embodiment, the bicycle component portion 32 includes the brake lever 16, and constitutes a hydraulic brake lever assembly that is mounted to the bicycle handlebar 12 by the bicycle attachment portion 30 of the first base part 20 cooperates with the second base part 22, as discussed below.

As seen in FIGS. 2 to 4, 9 and 10, the bicycle attachment portion 30 has a first pivot end 40, a first fastening end 42 and a first curved mounting surface 44 disposed between the first pivot end 40 and the first fastening end 42. Similarly, the second base part 22 has a second pivot end 50, a second fastening end 52 and a second curved mounting surface 54 disposed between the second pivot end 50 and the second fastening end 52. The first and second pivot ends 40 and 50 are pivotally connected by the hinge pin 24. In other words, the hinge pin 24 (i.e., the hinge structure) pivotally couples the first and second pivot ends 40 and 50 of the first and second base parts 20 and 22 together about the pivot axis A. Thus, the first and second base parts 20 and 22 are configured as an open type fixing band with drop-off prevent structure (e.g., the locking pin 28).

The first and second fastening ends 42 and 52 are releasably coupled together by the fixing bolt 26. In other words, the fixing bolt 26 (i.e., the releasable connecting structure) releasably couples the first and second fastening ends 42 and 52 of the first and second base parts 20 and 22 together. The first and second curved mounting surfaces 44 and 54 are concaved to clamp the bicycle handlebar 12 or any other type of a tubular member by tightening the fixing bolt 26. In conventional arrangements, if the fixing bolt 26 falls out, then the fixing band (the first and second base parts 20 and 22) would open, and then, the brake lever assembly with the fixing band would drop off the handlebar 12. However, with the locking pin 28, the first and second fastening ends 42 and 52 of the first and second base parts 20 and 22 do not open when the fixing bolt 26 falls out, and the hydraulic brake actuation device 10 remains on the handlebar 12. When a rider want to remove the hydraulic brake actuation device 10 from the handlebar 12, the rider first unscrews the fixing bolt 26. Then, the rider pushes (unlocking) the lock pin uses a tool T (see FIGS. 7 and 8) a pushing hole by like a needle. Then, finally, the rider pivots the second base part 22 (the movable portion) with respect to the first base part 20 to open the fixing band (the first and second base parts 20 and 22).

Figure 6:
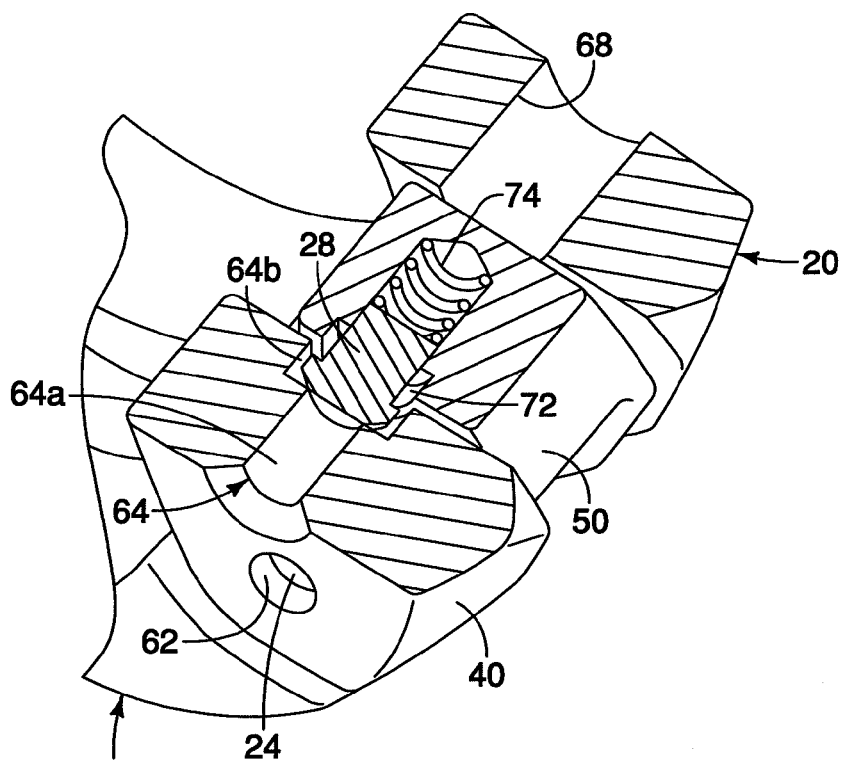
FIG. 6 is a cross sectional view of the hinge structure of the hydraulic disc brake assembly illustrated in FIGS. 1 to 5, as seen along section line 6-6 in FIG. 5, with the locking pin in the locking position.
Figure 7:
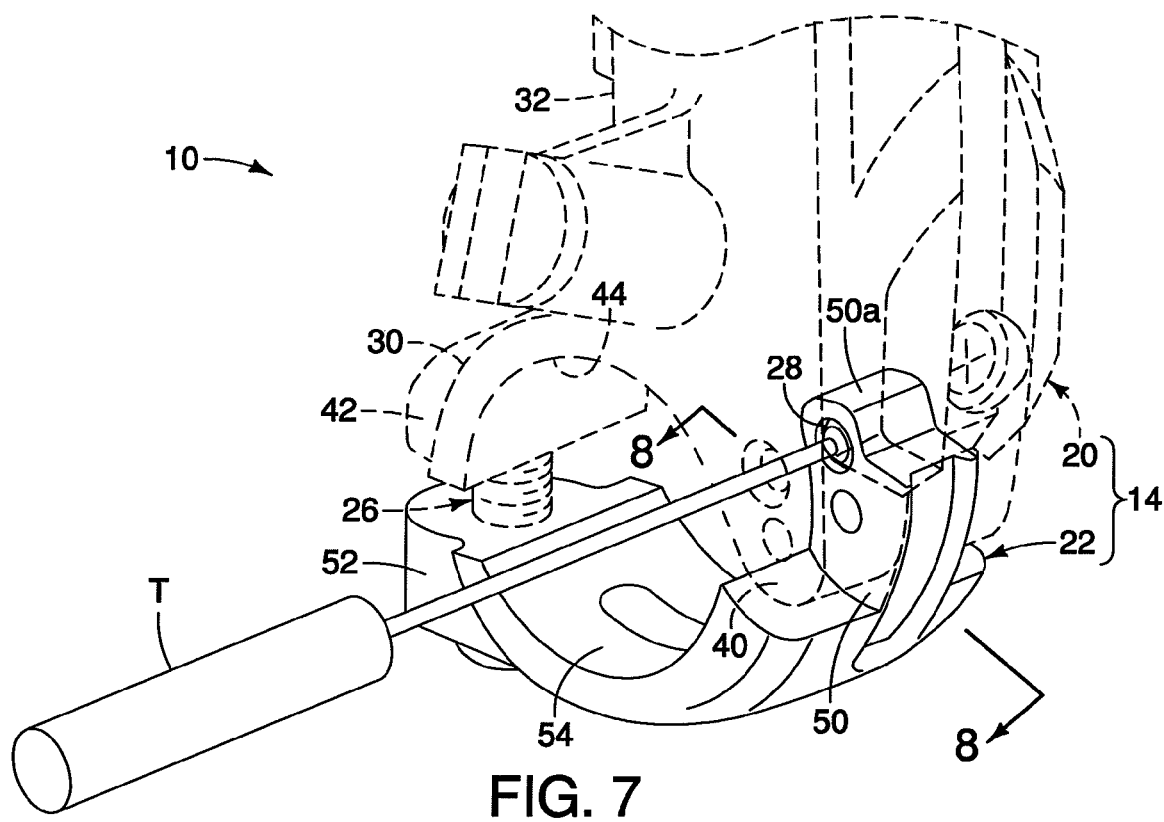
FIG. 7 is an enlarged, partial perspective view of the hinge structure of the hydraulic disc brake assembly illustrated in FIGS. 1 to 6, with the locking pin being pushed to the unlocking position.
Figure 8:
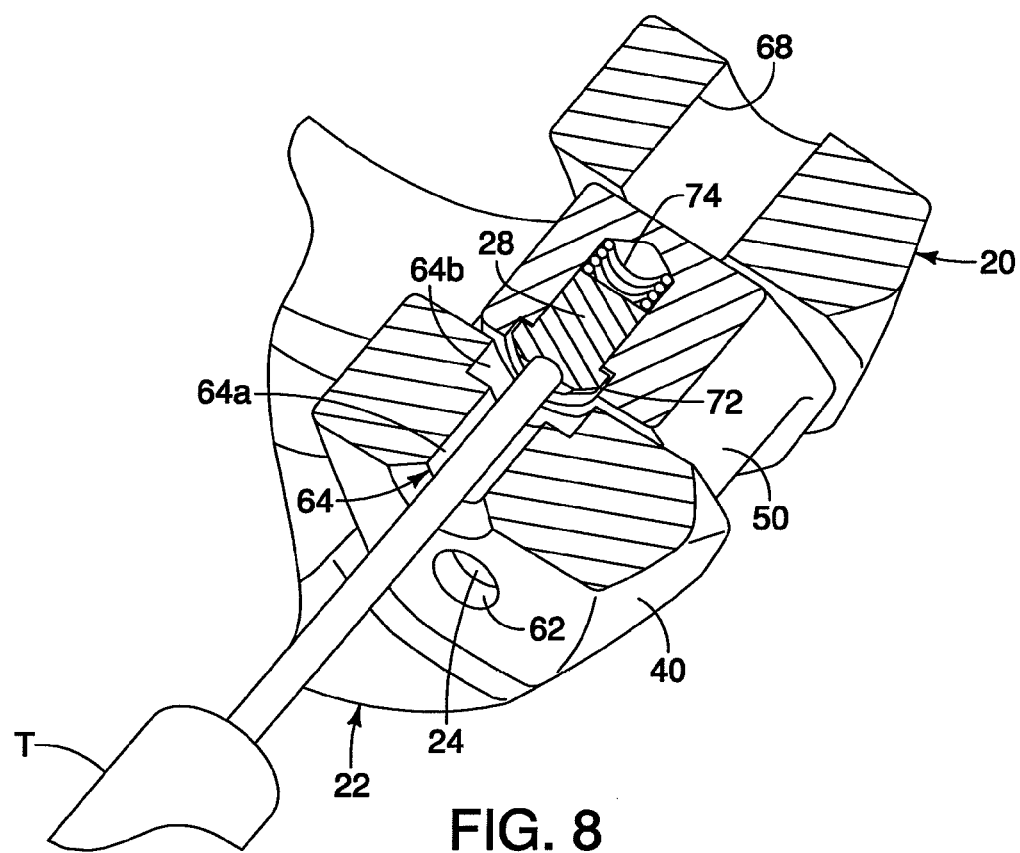
FIG. 8 is a cross sectional view of the hinge structure of the hydraulic disc brake assembly illustrated in FIGS. 1 to 7, as seen along section line 8-8 in FIG. 7, with the locking pin being pushed to the unlocking position.
Figure 12:
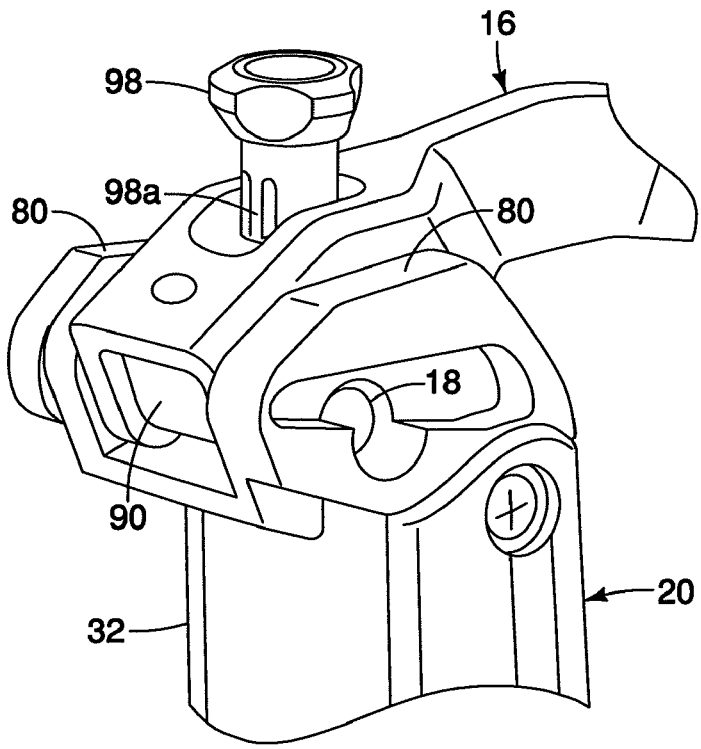
FIG. 12 is an enlarged, partial perspective view of the connection of the brake lever to the first base part of the hydraulic disc brake assembly.
Figure 13:
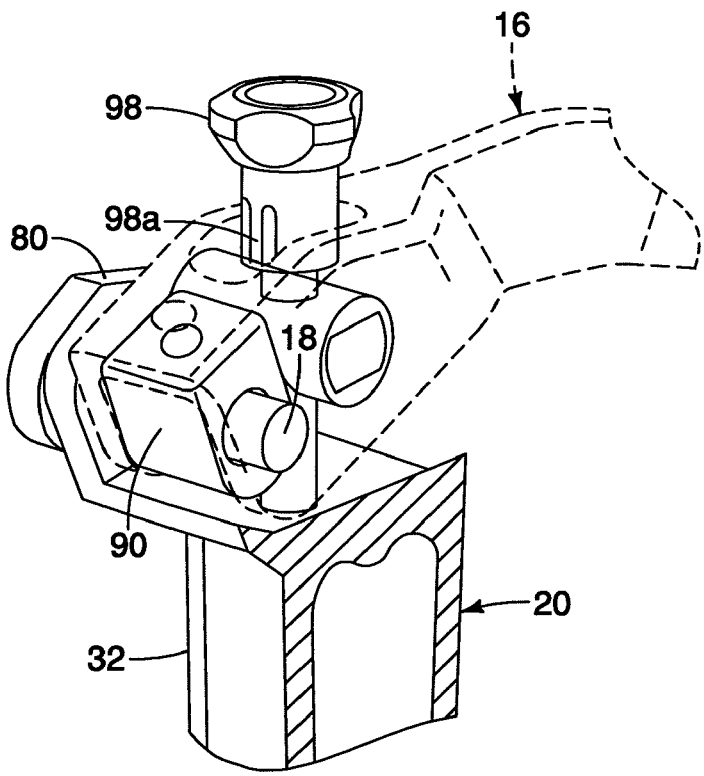
FIG. 13 is a cross sectional view of the first base part showing the connection for connecting the brake lever to the first base part.

As best seen in FIG. 10, the first pivot end 40 of the first base part 20 includes a first hinge flange 56 and a second hinge flange 58, with the first and second hinge flanges 56 and 58 being separated by a space 60. The first hinge flange 56 includes a pair of through holes 62 and 64, while the second hinge flange 58 has a blind bore 66 and a through hole 68. The through hole 62 and the blind bore 66 form a pivot bore that receives the hinge pin 24. Preferably, the hinge pin 24 is press-fitted into the through hole 62 and the blind bore 66 with an interference fit therebetween. The through hole 64 has a first portion 64a and a second portion 64b. The second portion 64b constitutes a first locking bore for receiving the locking pin 28 when the locking pin 28 is in the locking position as seen in FIG. 6. The first portion 64a constitutes a tool access aperture for receiving the tool T that is used to move the locking pin 28 from the locking position to the unlocking position as seen in FIGS. 7 and 8. The second portion 64b (i.e., the tool access aperture) communicates with the first portion 64a (i.e., the first locking bore) of the first base part 20 such that the lock pin is retractable by pushing the tool T through the second portion 64b (i.e., the tool access aperture) of the through hole 64 and against the lock pin 28.

As best seen in FIG. 11, the second pivot end 50 of the second base part 22 includes a through hole 70 and a blind bore 72. The through hole 62 form a pivot hole that receives the hinge pin 24. Thus, the hinge pin 24 pivotally supports the second base part 22 to the first base part 20. The blind bore 72 constitutes a second locking bore that has a biasing element 74 disposed therein as seen in FIGS. 6 and 8. The biasing element 74 applies an urging force on the lock pin 28 to bias the lock pin 28 to the locking position. Thus, the lock pin 28 is retractably retained within the first portion 64a (i.e., the first locking bore) of the through hole 64 in the first pivot end 40 of the first base part 20 when the lock pin 28 is in the unlocking position. In the locking position, the lock pin 28 is disposed in the first portion 64a (i.e., the first locking bore) of the through hole 64 in the first base part 20 and the blind bore 72 (i.e., the second locking bore) in the second base part 22. In other words, the lock pin 28 extends between the first and second base parts 20 and 22 to lock them together in the closed position. Thus, the lock pin 28 is movably disposed between the first and second base parts 20 and 22 to move between the locking position and the unlocking position, with the lock pin 28 being engaged with both of the first and second pivot ends 40 and 50 of the first and second base parts 20 and 22 when the lock pin 28 is in the locking position, and with the lock pin 28 being disengaged from the first pivot end 40 of the first base part 20 when the lock pin 28 is in the unlocking position. More specifically, the lock pin 28 is movably disposed in the first and second locking bores (i.e., the first portion 64a of the through hole 64 in the first base part 20 and the blind bore 72 in the second base part 22) of the first and second pivot ends 40 and 50 of the first and second base parts 20 and 22 to move between the locking position and the unlocking position, with the lock pin 28 being engaged with both of the first and second locking bores when the lock pin 28 is in the locking position, and with the lock pin 28 being disengaged from the first locking bore when the lock pin 28 is in the unlocking position. Of course, it will be apparent from this disclosure that the lock pin 28 can be rearranged to disengaged from the second pivot end 50 of the second base part 22 when the lock pin 28 is in the unlocking position as needed and/or desired.

Figure 2:
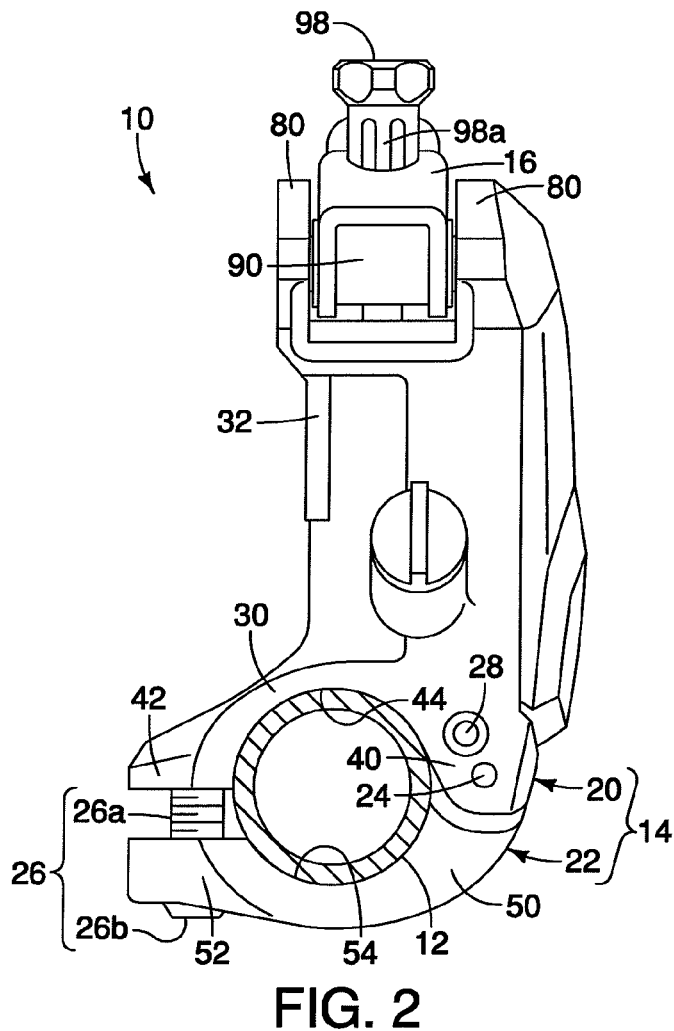
FIG. 2 is an inner side elevational view of the hydraulic disc brake assembly illustrated in FIG. 1, with the bicycle component fixing band fixed to a bicycle handlebar (e.g. a bicycle frame member)
Figure 3:
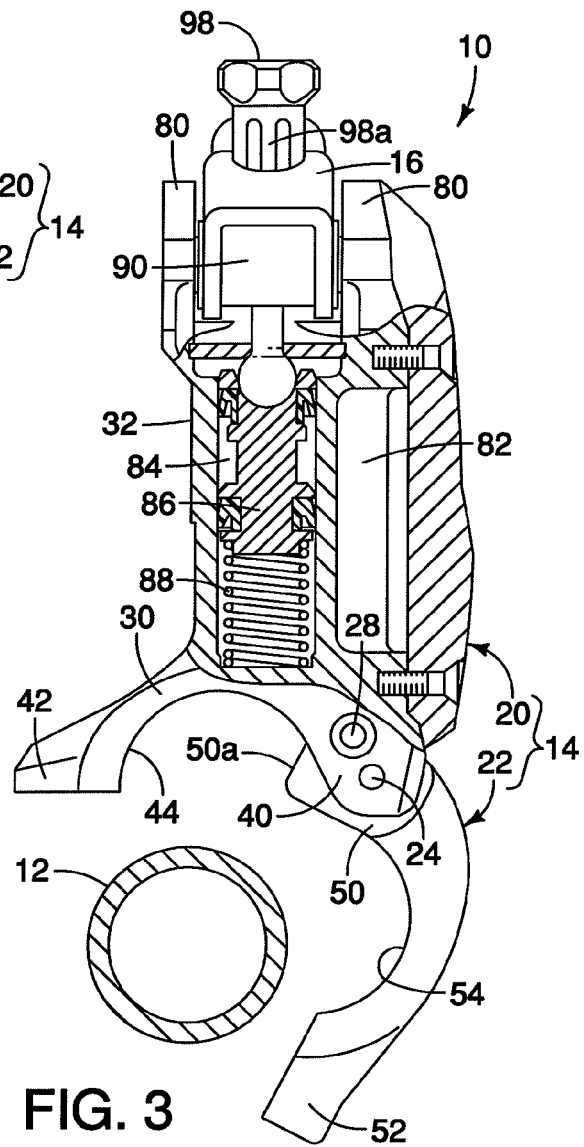
FIG. 3 is a side elevational view of the hydraulic disc brake assembly illustrated in FIGS. 1 and 2, with the bicycle component fixing band in an open position and removed from the bicycle handlebar (e.g. a bicycle frame member)
Figure 4:
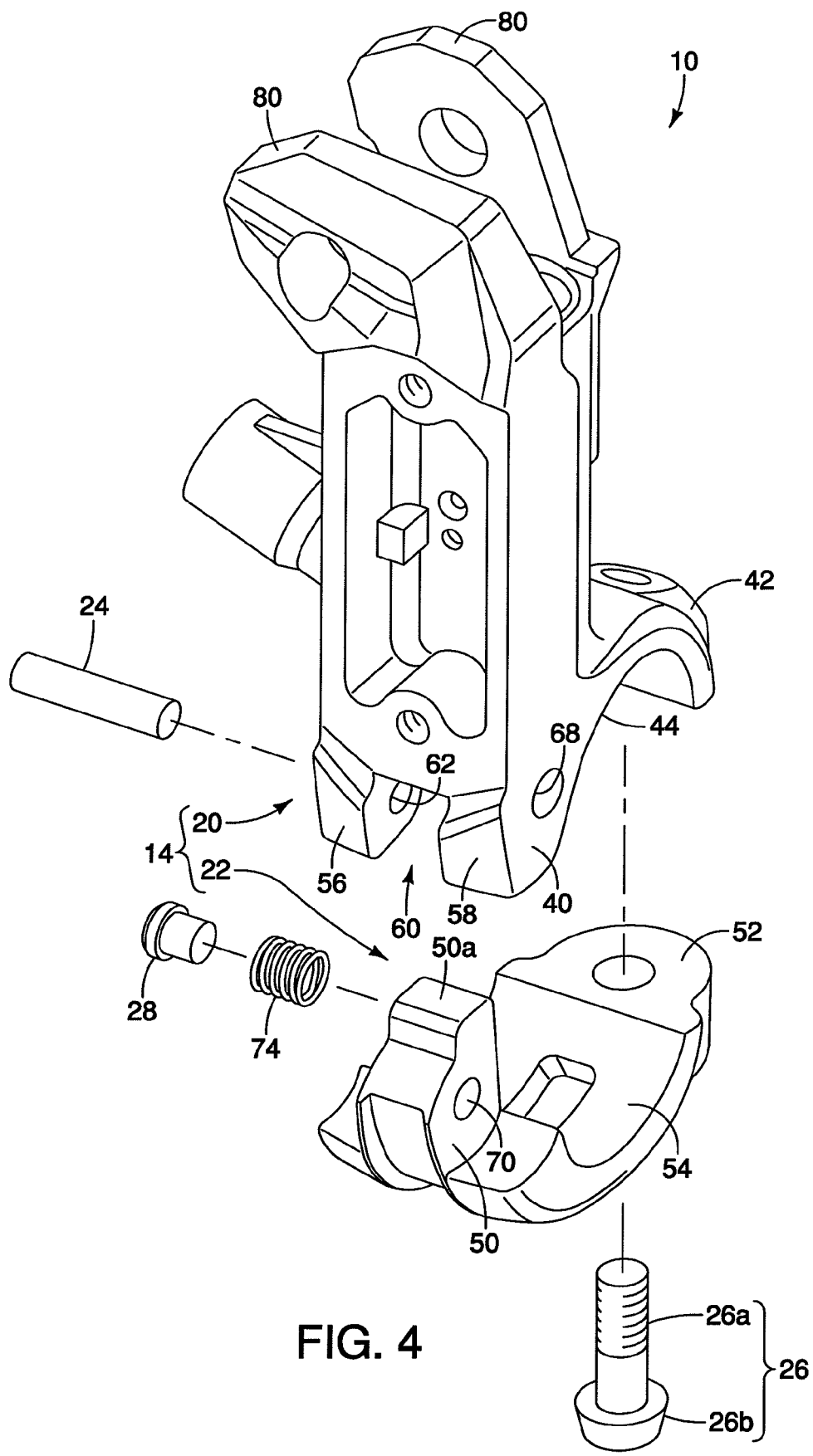
FIG. 4 is a perspective view of selected portions of the hydraulic disc brake assembly illustrated in FIGS. 1 to 3.
Figure 5:
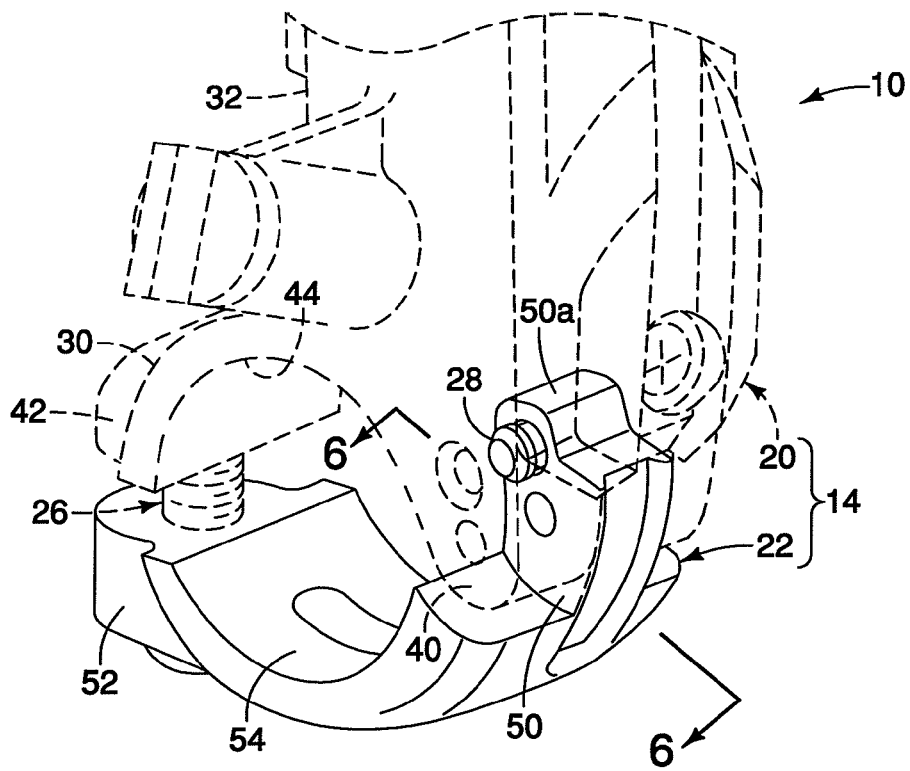
FIG. 5 is an enlarged, partial perspective view of the hinge structure of the hydraulic disc brake assembly illustrated in FIGS. 1 to 4, with the locking pin in the locking position.

As best seen in FIGS. 2 to 4, the first fastening end 42 of the first base part 20 has a threaded hole 76, while the second fastening end 52 of the second base part 22 has an unthreaded hole 78. The threaded hole 76 constitutes a nut portion of the releasable connecting structure. The first and second fastening ends 42 and 52 are releasably coupled together by the fixing bolt 26. In other words, the fixing bolt 26 and the threaded hole 76 (i.e., the releasable connecting structure) cooperate together to releasably couple the first and second fastening ends 42 and 52 of the first and second base parts 20 and 22 together. In particular, the fixing bolt 26 (i.e., the releasable connecting structure) includes a threaded shaft member 26a and a head member 26b. The threaded shaft member 26a is inserted through the unthreaded hole 78 of the second fastening end 52 of the second base part 22 and then threaded into the threaded hole 76 such that the head member 26b engages the second base part 22 of the second base part 22 and the threaded shaft member 26a engages the threaded hole 76 in the first fastening end 42 of the first base part 20 to pull the first and second fastening ends 42 and 52 of the first and second base parts 20 and 22 together.

As seen in FIGS. 2 to 4, the second pivot end 50 of the second base part 22 has an extended portion 50a. With the second base part 22 in the closed position, the extended portion 50a is located in the space 60 between the first and second hinge flanges 56 and 58 of the first base part 20. When the hydraulic brake actuation device 10 is installed on the handlebar 12, the extended portion 50a will be pushed by the handlebar 12 to pivot the second base part 22 so that the first and second base parts 20 and 22 close and stay in a closing position for easy fixing the fixing bolt 16 even if locking pin 28 was removed.

As seen in FIGS. 2 to 4, the bicycle component portion 32 of the first base part 20 has a pair of lever attachment flanges 80, a fluid reservoir tank 82 and a fluid chamber 84. The brake lever 16 is pivotally attached to the lever attachment flanges 80 by the pivot pin 18. As seen in FIG. 3, the fluid chamber 84 has a piston 86 movably disposed in the fluid chamber 84 in response to movement by the brake lever 16. The piston 86 is biased to a rest position by a coiled spring 88. The basic braking operation of the hydraulic brake actuation device 10 is described in U.S. Published Application No. 2008/0251334 (assigned to Shimano Inc.), and thus, will not be described herein for the sake of brevity.

Figure 14:
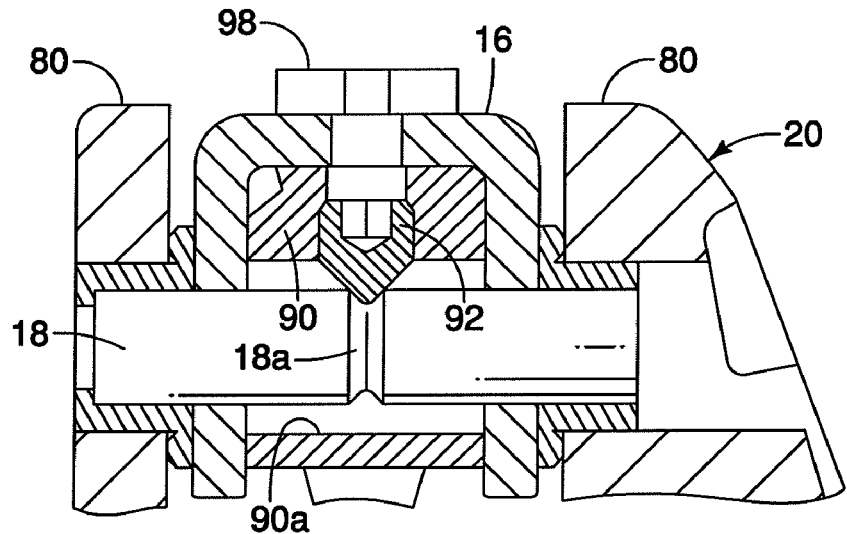
FIG. 14 is a cross sectional view of the connection of the brake lever to the first base part of the hydraulic disc brake assembly, as seen along section line 14-14 in FIG. 12.
Figure 15:
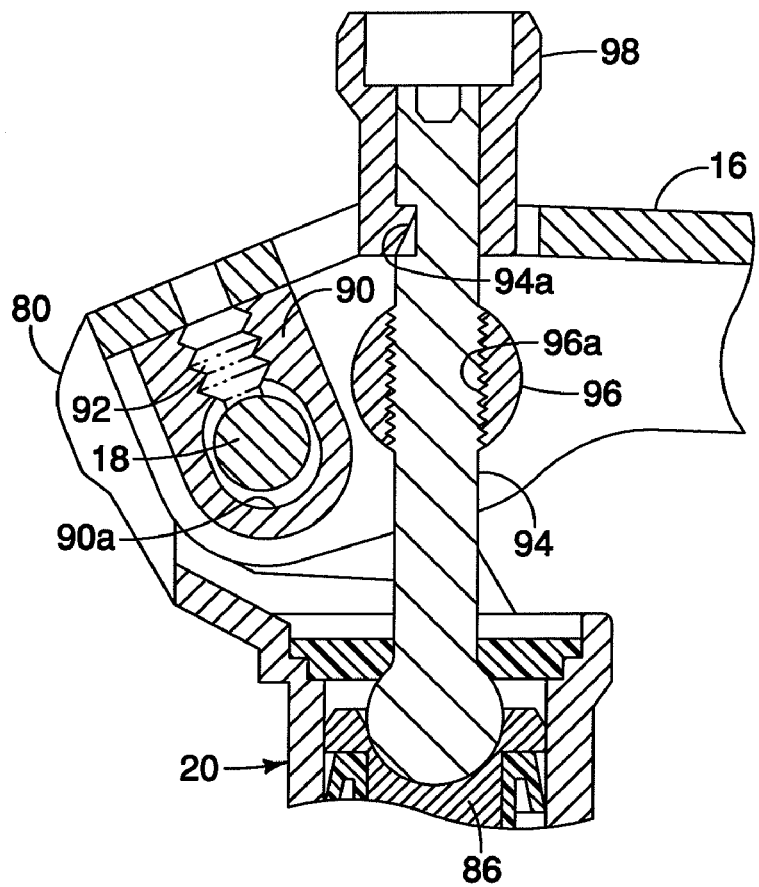
FIG. 15 is a cross sectional view of the connection of the brake lever to the first base part of the hydraulic disc brake assembly, as seen along section line 15-15 in FIG. 12.
Figure 16:
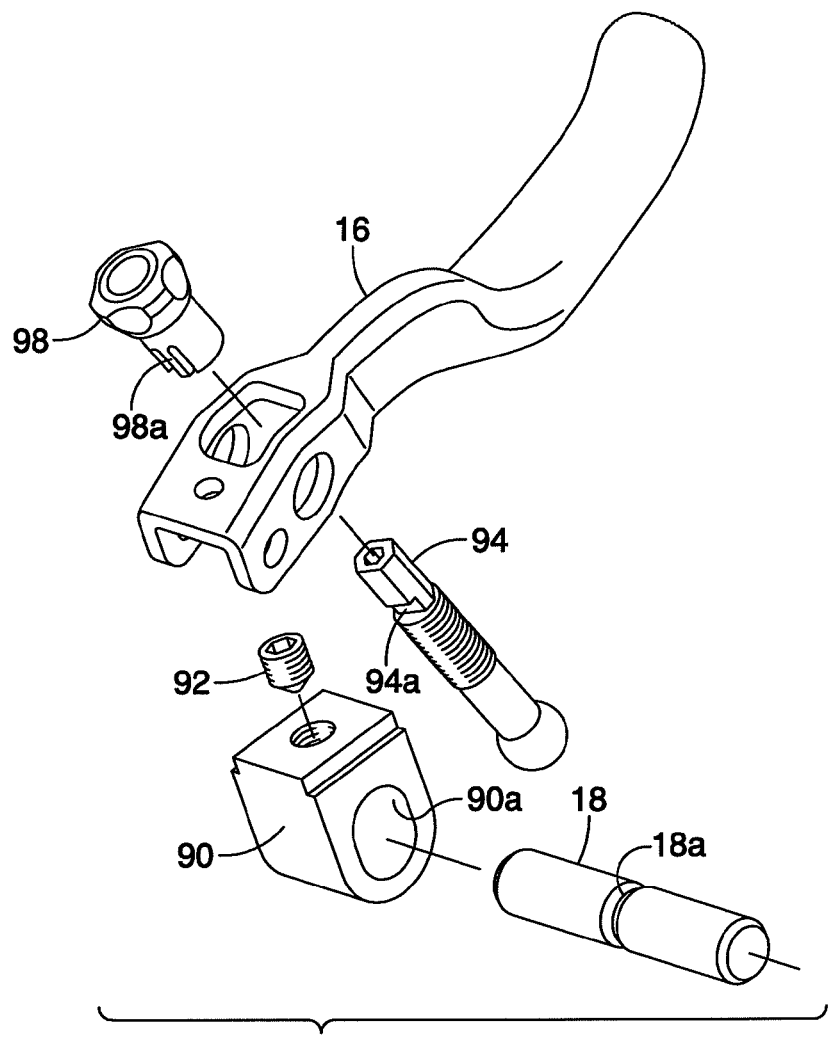
FIG. 16 is an exploded perspective view of selected parts of the hydraulic disc brake assembly illustrated in FIGS. 1 to 15.

Now referring to FIG. 12 to 18, the brake lever 16 is pivotally attached to the lever attachment flanges 80 by the pivot pin 18. Since the brake lever 16 is a press molded member, the brake lever 16 can rattle on the pivot pin 18 during riding on rough terrain. As seen in FIGS. 14 to 16, to prevent this rattling of the brake lever 16 on the pivot pin 18, the brake lever 16 is provided with an adjusting block 90 that has an elongate hole 90a with the pivot pin 18 disposed in the elongate hole 90a of the adjusting block 90. A set screw 92 is screwed into a threaded hole of the adjusting block 90 to engage a groove 18a in the pivot pin 18. The set screw 92 pushes the adjusting block 90 against the brake lever 16 to take up any play between the brake lever 16 and the pivot pin 18, so that rattling of the brake lever 16 will be alleviated.

Figure 17:
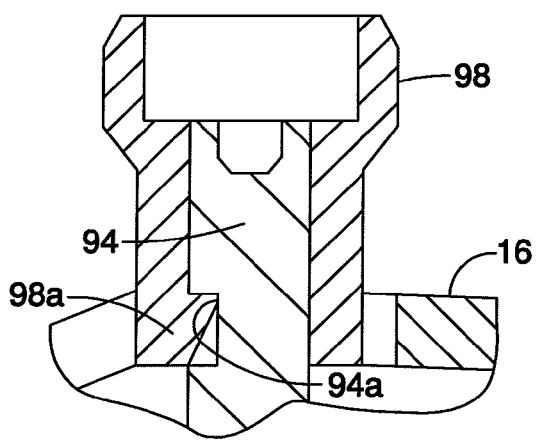
FIG. 17 is a cross sectional view of the connection of the adjustment knob to the control rod of the hydraulic disc brake assembly, as seen along section line 17-17 in FIG. 12.
Figure 18:
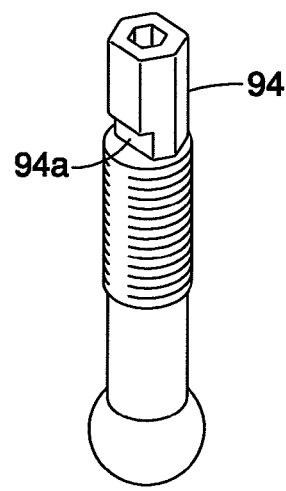
FIG. 18 is a perspective view of the control rod of the hydraulic disc brake assembly illustrated in FIGS. 1 to 17.

As seen in FIGS. 15 and 17, the brake lever 16 is connected to the piston 86 by a push rod 94. The push rod 94 is adjustably connected to the brake lever 16 by a connecting member 96 with a threaded hole 96a. The push rod 94 is threaded into the threaded hole 96a of the connecting member 96. One end of the push rod 94 is provided with an adjusting knob 98, while the other end of the push rod 94 is engaged with the piston 86. By rotating the adjusting knob 98, the reach between the brake lever 16 and the handlebar 12 can be adjusted. The adjusting knob 98 is provided with an easy attachment structure. In particular, the adjusting knob 98 has a snap-on hook 98a that engages a notch 94a of the push rod 94.

Referring now to FIGS. 19 to 28, three modified hinge structures are illustrated for the hydraulic brake actuation device 10. In other words, the three modified hinge structures, illustrated in FIGS. 19 to 28, replace the hinge structure shown in FIGS. 1 to 11. Thus, the parts of the three modified hinge structures that are identical to the hinge structure shown in FIGS. 1 to 11 will use the same reference numerals.

Figure 19:
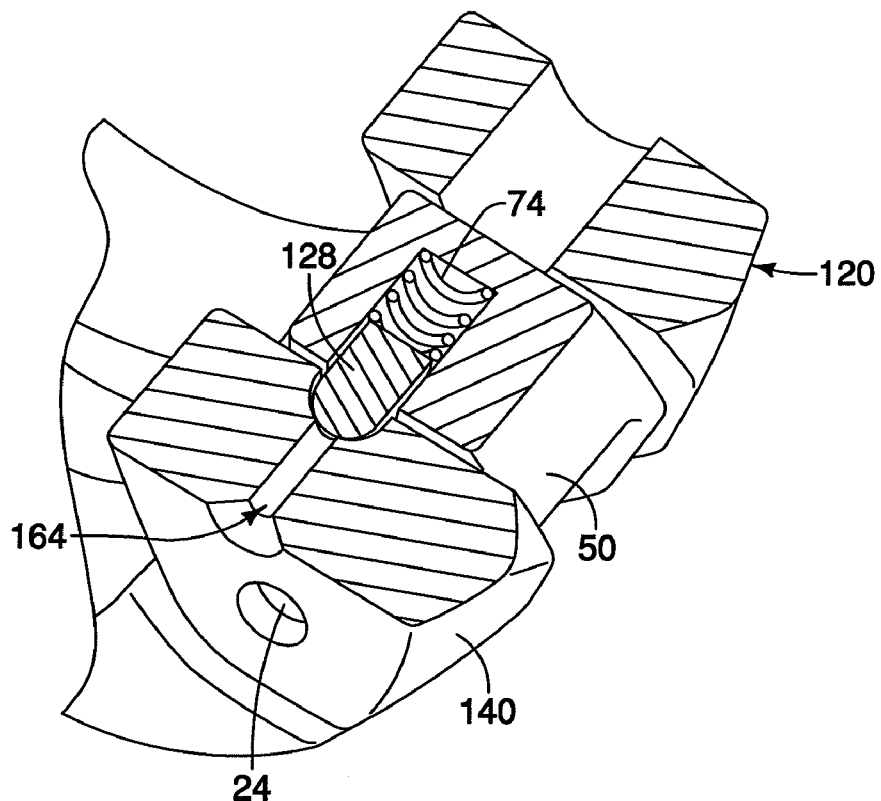
FIG. 19 is a cross sectional view, similar to FIG. 6, of a modified hinge structure with a modified locking pin in the locking position.
Figure 20:
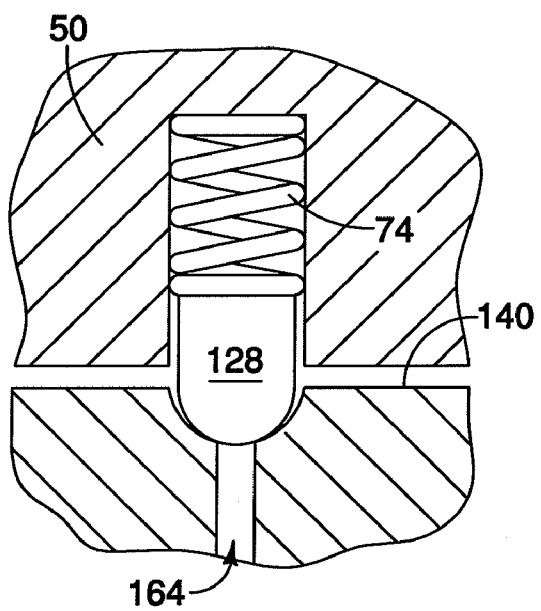
FIG. 20 is a simplified cross sectional view of the modified hinge structure illustrated in FIG. 19 with the modified locking pin in the locking position.
Figure 21:
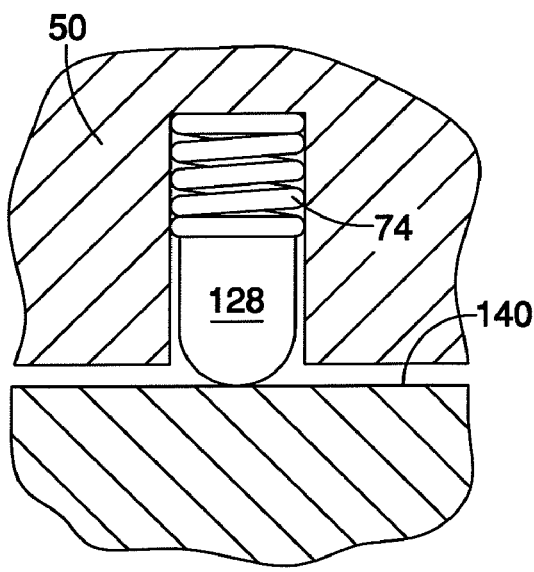
FIG. 21 is a simplified cross sectional view of the modified hinge structure illustrated in FIGS. 19 and 20 with the modified locking pin in the unlocking position.

As seen in FIGS. 19 to 21, in this modified hinge structure, a locking pin 128 is provided with a rounded or spherical tip. A first base part 120 of the hydraulic brake actuation device is provided with a first pivot end 140 that includes a through hole 164 with a first portion 164a and a second portion 164b. The second portion 164b is provided with a partial spherical surface for receiving the rounded or spherical tip of the locking pin 128 when the locking pin 128 is in the locking position.

Figure 22:
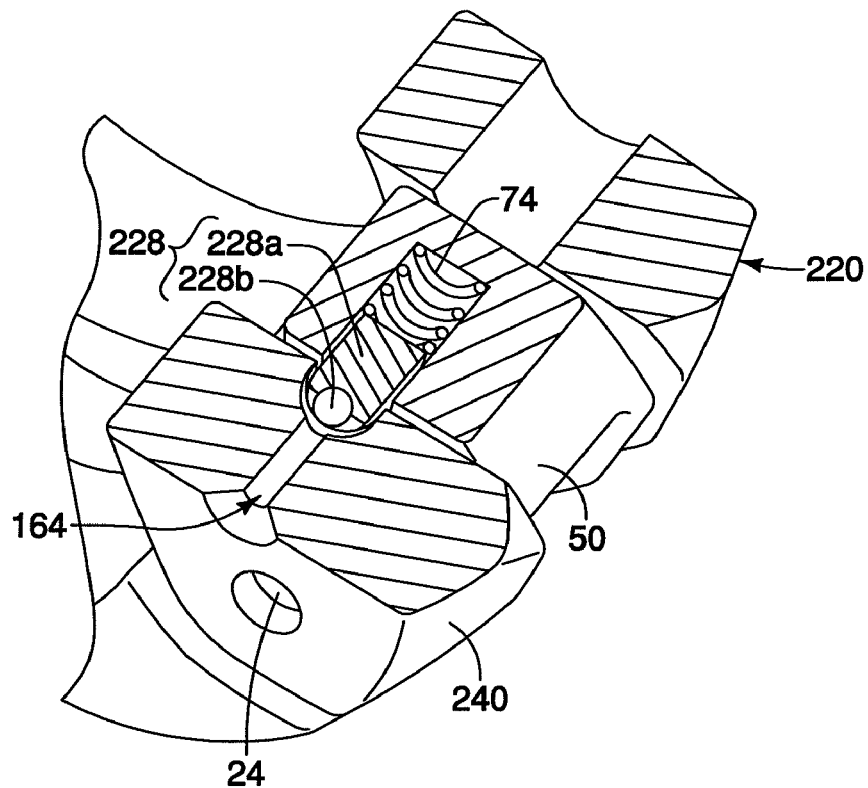
FIG. 22 is a cross sectional view, similar to FIG. 6, of a modified hinge structure with a modified locking pin in the locking position.
Figure 23:
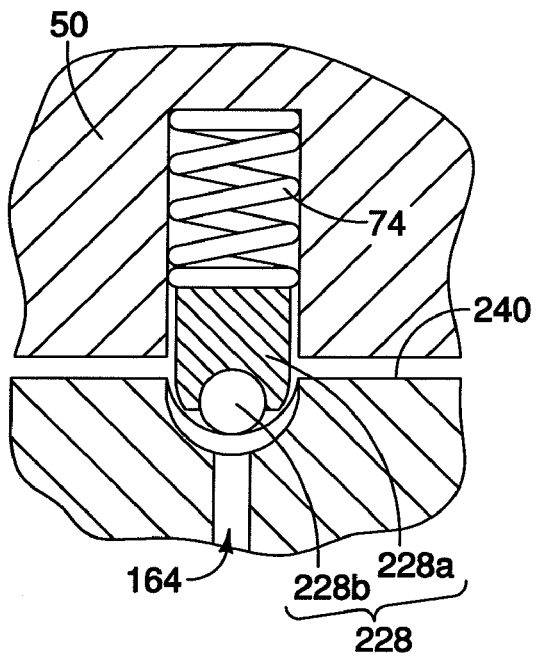
FIG. 23 is a simplified cross sectional view of the modified hinge structure illustrated in FIG. 22 with the modified locking pin in the locking position.
Figure 24:
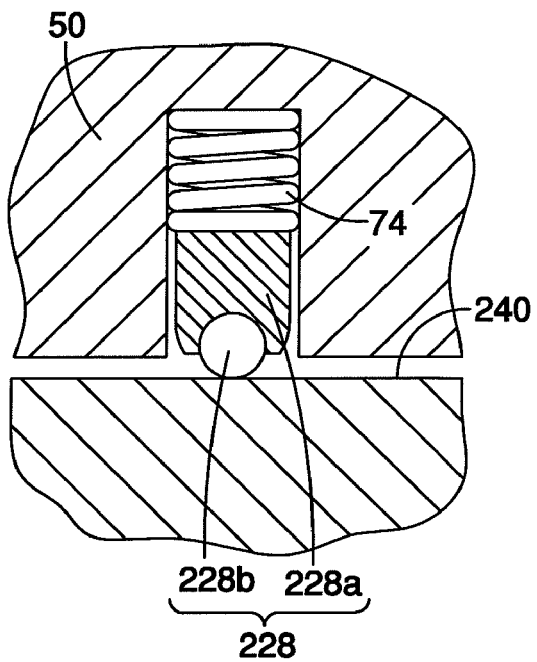
FIG. 24 is a simplified cross sectional view of the modified hinge structure illustrated in FIGS. 22 and 23 with the modified locking pin in the unlocking position.

As seen in FIGS. 22 to 24, in this modified hinge structure, a locking pin 228 is provided with a pushing part 228a and a ball or rolling part 228b. A first base part 220 of the hydraulic brake actuation device is provided with a first pivot end 240 that includes a through hole 264 with a first portion 264a and a second portion 264b. The second portion 264b is provided with a partial spherical surface for receiving the rolling part 228b of the locking pin 228 when the locking pin 228 is in the locking position.

Figure 25:
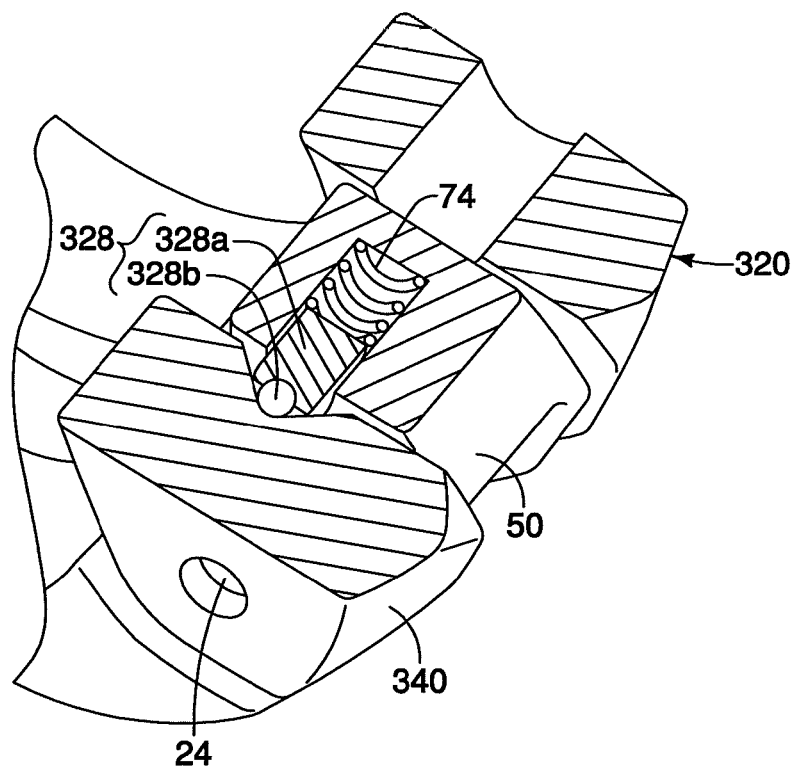
FIG. 25 is a cross sectional view, similar to FIG. 6, of a modified hinge structure with a modified locking pin in the locking position.
Figure 26:
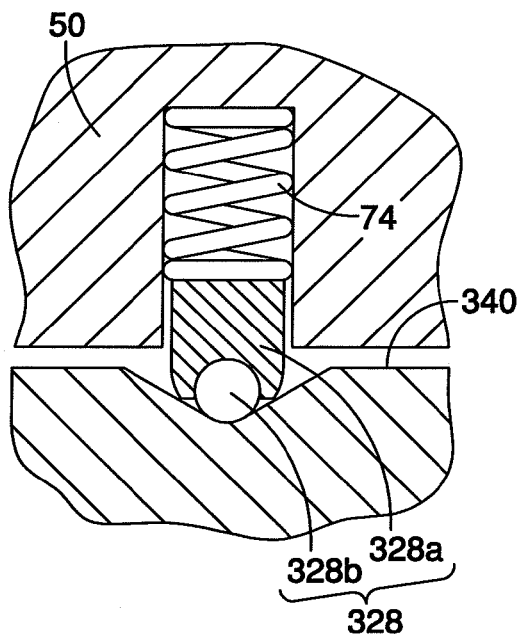
FIG. 26 is a simplified cross sectional view of the modified hinge structure illustrated in FIG. 25 with the modified locking pin in the locking position.
Figure 27:
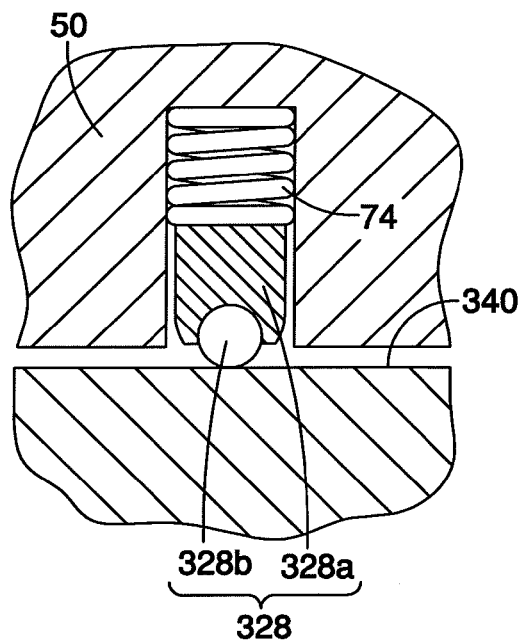
FIG. 27 is a simplified cross sectional view of the modified hinge structure illustrated in FIGS. 25 and 26 with the modified locking pin in the unlocking position.

As seen in FIGS. 25 to 27, in this modified hinge structure, the locking pin 228 of the prior modified hinge structure is used such that the locking pin 228 is provided with the pushing part 228a and the rolling part 228b. However, a first base part 220 of the hydraulic brake actuation device is provided with a first pivot end 240 that includes a locking recess 264. The locking recess 264 is provided with a partial spherical surface for receiving the rolling part 228b of the locking pin 228 when the locking pin 228 is in the locking position. The locking recess 264 forms a rolling surface that is shaped so that the second base part 22 can be pivoted by applying a force that will cause the spring 74 to be compressed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle component fixing band. Accordingly, these terms, as utilized to describe the present invention should be interpreted relative to a bicycle equipped with the bicycle component fixing band as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle component fixing band comprising:
    a first base part including a bicycle component portion and a bicycle attachment portion having a first pivot end, a first fastening end and a first mounting surface disposed between the first pivot end and the first fastening end;
    a second base part having a second pivot end, a second fastening end and a second mounting surface disposed between the second pivot end and the second fastening end;
    a hinge structure pivotally coupling the first and second pivot ends of the first and second base parts together about a pivot axis;
    a releasable connecting structure releasably coupling the first and second fastening ends of the first and second base parts together; and
    a lock pin movably disposed between the first and second base parts to move between a locking position and an unlocking position, with the lock pin being engaged with both of the first and second pivot ends of the first and second base parts when the lock pin is in the locking position, and with the lock pin being disengaged from one of the first and second pivot ends of the first and second base parts when the lock pin is in the unlocking position.

2. The bicycle component fixing band according to claim 1, wherein
    the lock pin is movably along an axis that is offset from the pivot axis.

3. The bicycle component fixing band according to claim 1, wherein
the bicycle attachment portion includes a pivotally mounted lever.

4. The bicycle component fixing band according to claim 3, wherein
the bicycle attachment portion includes a fluid chamber with a piston movably disposed in the fluid chamber by the lever.

5. The bicycle component fixing band according to claim 1, wherein
the bicycle attachment portion includes a fluid chamber with a piston movably disposed in the fluid chamber by the lever.

6. The bicycle component fixing band according to claim 1, wherein
the first and second mounting surfaces curved surfaces that are concaved to clamp a tubular member.

7. The bicycle component fixing band according to claim 1, wherein
the releasable connecting structure includes a threaded shaft member engaging one of the first and second base parts and a nut portion with a threaded hole that threadedly receives the threaded shaft member to pull the first and second fastening ends together.

8. The bicycle component fixing band according to claim 1, wherein
the first pivot end of the first base part includes a first locking bore,
the second pivot end of the second base part includes a second locking bore,
the lock pin is movably disposed in the first and second locking bores of the first and second pivot ends of the first and second base parts to move between the locking position and the unlocking position, with the lock pin being engaged with both of the first and second locking bores when the lock pin is in the locking position, and with the lock pin being disengaged from one of the first and second locking bores when the lock pin is in the unlocking position.

9. The bicycle component fixing band according to claim 8, wherein
the lock pin is retractably retained within the first locking bore of the first pivot end of the first base part when the lock pin is in the unlocking position.

10. The bicycle component fixing band according to claim 9, wherein
the second locking bore of the second base part includes a biasing element that applies an urging force to bias the lock pin to the locking position.

11. The bicycle component fixing band according to claim 10, wherein
the first base part includes a tool access aperture communicating with the first locking bore of the first base part such that the lock pin is retractable by pushing a tool through the tool access aperture and against the lock pin.

* * * * *